United States Patent
Xia et al.

(10) Patent No.: US 11,452,087 B2
(45) Date of Patent: Sep. 20, 2022

(54) DATA TRANSMISSION SENDING METHOD, RECEIVING METHOD AND APPARATUS

(71) Applicant: ZTE Corporation, Shenzhen (CN)

(72) Inventors: Shuqiang Xia, Shenzhen (CN); Jing Shi, Shenzhen (CN); Min Ren, Shenzhen (CN); Xianghui Han, Shenzhen (CN); Chunli Liang, Shenzhen (CN); Wei Lin, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 14 days.

(21) Appl. No.: 17/054,121

(22) PCT Filed: May 9, 2019

(86) PCT No.: PCT/CN2019/086088
§ 371 (c)(1),
(2) Date: Nov. 9, 2020

(87) PCT Pub. No.: WO2019/214658
PCT Pub. Date: Nov. 14, 2019

(65) Prior Publication Data
US 2021/0120530 A1    Apr. 22, 2021

(30) Foreign Application Priority Data

May 10, 2018  (CN) .......................... 201810445202.5

(51) Int. Cl.
*H04W 72/04* (2009.01)
*H04L 5/00* (2006.01)

(52) U.S. Cl.
CPC ......... *H04W 72/042* (2013.01); *H04L 5/0048* (2013.01)

(58) Field of Classification Search
CPC .......................... H04W 72/042; H04L 5/0048
See application file for complete search history.

(56) References Cited

U.S. PATENT DOCUMENTS

| 2016/0242203 | A1  | 8/2016 | You |              |
|---|---|---|---|---|
| 2019/0150183 | A1* | 5/2019 | Aiba | ...... H04L 5/0053 |
| 2019/0223204 | A1* | 7/2019 | Kim  | ...... H04L 5/0055 |

FOREIGN PATENT DOCUMENTS

CN           106911999 A        6/2017

OTHER PUBLICATIONS

3GPP TSG-RAN WG1 Meeting #90, Huawei, DCI Design for URLLC, Oct. 9-13, 2017, R1-1717088.

(Continued)

*Primary Examiner* — Ronald B Abelson
(74) *Attorney, Agent, or Firm* — Cantor Colburn LLP

(57) ABSTRACT

Provided are a data transmission receiving method, which includes that: a second communication node receives one or more Physical Downlink Control Channels (PDCCHs) from a first communication node, wherein when the second communication node receives multiple PDCCHs, Physical Downlink Shared Channels (PDSCHs) indicated by the multiple PDCCHs are located in the same serving cell, and the indicated PDSCHs have the same time domain end position and different time domain start positions. Also provided are a data transmission sending method and apparatus, a data transmission receiving apparatus, a storage medium and an electronic apparatus.

18 Claims, 4 Drawing Sheets

(56) References Cited

OTHER PUBLICATIONS

3GPP TSG-RAN WG1 Meeting #92, Nokia, "On DL Control Enhancements for LTE URLLC", Feb. 26-Mar. 2, 2017, R1-1801865.
International Search Report for corresponding application PCT/CN2019/086088 filed May 9, 2019; dated Jul. 30, 2019.

* cited by examiner

A second communication node receives one or more PDCCHs from a first communication node, wherein when the second communication node receives multiple PDCCHs, PDSCHs indicated by the multiple PDCCHs are located in the same serving cell, and the indicated PDSCHs have the same time domain end position and different time domain start positions — S202

| Subframe 1 | | Subframe 2 | | Subframe 3 | | Subframe 4 | |
|---|---|---|---|---|---|---|---|
| PDCCH-1 | PDSCH | PDCCH-2 | PDSCH | PDCCH-3 | PDSCH | | PDSCH |

Fig.3

A first communication node respectively sends one or more PDCCHs to a second communication node at multiple candidate time domain positions, wherein when the first communication node sends multiple PDCCHs, PDSCHs indicated by the multiple PDCCHs are located in the same serving cell, and the PDSCHs indicated by the multiple PDCCHs have the same time domain end position and different time domain start positions — S402

Fig.4

DATA TRANSMISSION SENDING METHOD, RECEIVING METHOD AND APPARATUS

CROSS-REFERENCE TO RELATED APPLICATION

The present application claims priority to Chinese Patent Application No. 201810445202.5, filed to National Intellectual Property Administration, PRC on May 10, 2018, the disclosure of which is hereby incorporated by reference in its entirety.

TECHNICAL FIELD

Embodiments of the present disclosure relate to the field of communications, and in particular to a data transmission sending method and apparatus, and a data transmission receiving method and apparatus.

BACKGROUND

In wireless communication systems, in order to obtain uplink or downlink Channel State Information (CSI), a first communication node (such as a base station) often uses some fields of Downlink Control Information (DCI) (the control information is carried by a Physical Downlink Control Channel (PDCCH), one PDCCH carries one piece of control information, and as both the PDCCH and the control information are in a one-to-one corresponding relationship, they are not distinguished strictly in the following description) to dynamically trigger a second communication node (such as a terminal) to send a Sounding reference signal (SRS) or report downlink CSI. For instance, an "SRS request" field in the DCI is used to trigger the SRS sending, or a "CSI request" field is used to trigger the CSI reporting. With the SRS sending as an example, the first communication node configures resources and sending modes (including SRS periods, time domain offsets, bandwidths, whether to hop frequencies, etc.) capable of sending the SRS signal on some serving cell for the second communication node in advance. It is assumed that the second communication node detects on a subframe n that the serving cell sends trigger information of the SRS signal (the information is sent by the first communication node), the second communication node ensures that the time is greater than (n+offset), and the SRS signal is sent on a first available SRS resource. The offset is a constant associated with a communication mode, a processing capacity and so on.

For some special scenarios such as coverage enhancement, and low-latency and ultra-reliable communication, the first communication node typically needs to repeatedly send the control information on multiple subframes, thereby improving the reliability of the second communication node for receiving the control information. As the "SRS request" field and/or the "CSI request" field are also sent repeatedly, it is possible that the second communication node sends the SRS signal and/or reports the CSI for multiple times to cause a fuzzy problem of the first communication node for receiving the SRS signal and/or the CSI information. In order to avoid this problem, one solution is to specify the second communication node to send the SRS signal and/or report the CSI according to an indication of last received control information. However, such a manner is defective in: the second communication node is required to know a time domain position for sending a last PDCCH in a repetition period in advance, for example, the first communication node notifies the second communication node of the number of repetition times of the PDCCH, a detection start point and other information in advance. Due to such factors as a time-variant characteristic and a resource limitation of channels, when the first communication node sends the PDCCH according to the information notified in advance, the resource utilization efficiency is also lowered easily.

SUMMARY

Embodiments of the present disclosure provide a data transmission sending method and apparatus, and a data transmission receiving method and apparatus, to at least solve the problem that due to such factors as a time-variant characteristic and a resource limitation of channels, when a first communication node sends a PDCCH according to priorly notified information, the resource utilization efficiency is lowered easily.

The embodiments of the present disclosure provide a data transmission receiving method, which may include that: a second communication node receives one or more PDCCHs from a first communication node, wherein when the second communication node receives multiple PDCCHs, Physical Downlink Shared Channels (PDSCHs) indicated by the multiple PDCCHs are located in the same serving cell, and the indicated PDSCHs have the same time domain end position and different time domain start positions.

The embodiments of the present disclosure provide a data transmission sending method, which may include that: a first communication node respectively sends one or more PDCCHs to a second communication node at multiple candidate time domain positions, wherein when the first communication node sends multiple PDCCHs, PDSCHs indicated by the multiple PDCCHs are located in the same serving cell, and the PDSCHs indicated by the multiple PDCCHs have the same time domain end position and different time domain start positions.

The embodiments of the present disclosure provide a data transmission receiving apparatus, which may be located in a second communication node, and include: a receiving module, configured to receive one or more PDCCHs from a first communication node, wherein when the second communication node receives multiple PDCCHs, PDSCHs indicated by the multiple PDCCHs are located in the same serving cell, and the indicated PDSCHs have the same time domain end position and different time domain start positions.

The embodiments of the present disclosure provide a data transmission sending apparatus, which may be located in a first communication node, and include: a sending module, configured to respectively send one or more PDCCHs to a second communication node at multiple candidate time domain positions, wherein when the first communication node sends multiple PDCCHs, PDSCHs indicated by the multiple PDCCHs are located in the same serving cell, and the PDSCHs indicated by the multiple PDCCHs have the same time domain end position and different time domain start positions.

The embodiments of the present disclosure further provide a storage medium. The storage medium stores a computer program, and the computer program is configured to run to execute any step in the method embodiment.

The embodiments of the present disclosure further provide an electronic apparatus, which may include a memory and a processor; the memory stores a computer program; and the processor is configured to run the computer program to execute any step in the method embodiment.

By means of the embodiments of the present disclosure, as the PDSCHs indicated by the PDCCHs that are sent between the first communication node and the second communication node have the same time domain end position and the different time domain start positions, the problem that due to such factors as a time-variant characteristic and a resource limitation of channels, when the first communication node sends the PDCCH according to the information notified in advance, the resource utilization efficiency is also lowered easily may be solved, the data transmission is reliable, and the fuzzy effect when the first communication node receives a non-periodic SRS is avoided.

BRIEF DESCRIPTION OF THE DRAWINGS

The accompanying drawings are described here to provide a further understanding of the present disclosure, and form a part of the present disclosure. The schematic embodiments and description of the present disclosure are adopted to explain the present disclosure, and do not form improper limits to the present disclosure. In the drawings:

FIG. 3 is a structural diagram for data transmission according to an embodiment of the present disclosure.

FIG. 4 is a flowchart of a data transmission sending method according to an embodiment of the present disclosure.

DETAILED DESCRIPTION OF THE EMBODIMENTS

The embodiments of the present disclosure are described below with reference to the drawings and in conjunction with the embodiments in detail. It is to be noted that the embodiments of the present disclosure and the characteristics of the embodiments may be combined with each other if there is no conflict.

It is to be noted that, terms such as "first" and "second" in the specification, claims and accompanying drawings of the present disclosure are only used to distinguish similar objects and are unnecessary to describe a special order or a precedence order.

Embodiment 1

Figures 1, 2:
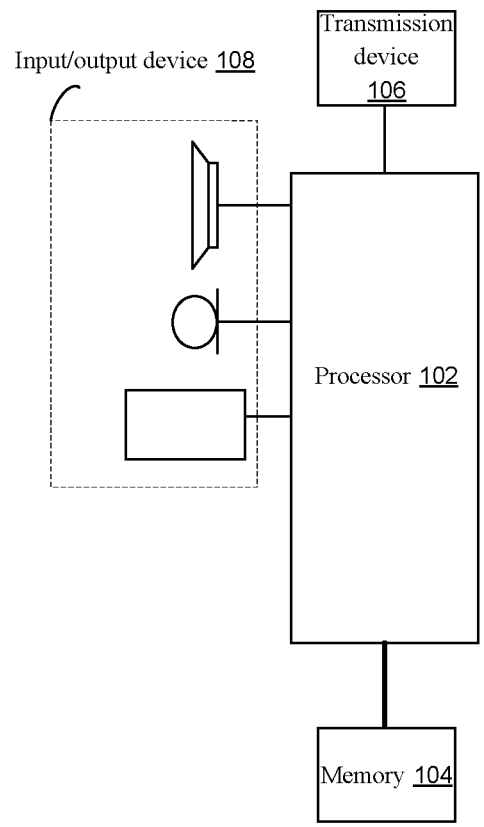
FIG. 1 is a block diagram of a hardware structure of a mobile terminal for a data transmission receiving method according to an embodiment of the present disclosure.
FIG. 2 is a flowchart of a data transmission receiving method according to an embodiment of the present disclosure.

The method embodiment provided by the Embodiment 1 of the present disclosure may be executed in a mobile terminal, a computer terminal or a similar operation device. For example, the method embodiment is executed on the mobile terminal, and FIG. 1 is a block diagram of a hardware structure of a mobile terminal for a data transmission receiving method according to an embodiment of the present disclosure. As shown in FIG. 1, the mobile terminal 10 may include one or more (only one is shown in FIG. 1) processors 102 (the processor 102 may include but not limited to a processing device such as a Microcontroller Unit (MCU) or a Field-Programmable Gate Array (FPGA)) and a memory 104 for storing data. In an embodiment, the mobile terminal may further include a transmission device 106 having a communication function and an input-output device 108. Those of ordinary skill in the art may understand that the structure shown in FIG. 1 is merely for illustration, rather than a limit to the above structure of the mobile terminal. For example, the mobile terminal 10 may further include more or less components shown in FIG. 1, or have a configuration different from FIG. 1.

The memory 104 may be configured to store a computer program, such as a software program and a module of application software, and a computer program corresponding to a data transmission receiving method in the embodiments of the present disclosure. The processor 102 runs the computer program stored in the memory 104 to execute various functional applications as well as data processing, that is, to implement the above method. The memory 104 may include a high-speed Random Access Memory (RAM), and may further include a non-volatile memory such as one or more magnetic storage devices, a flash memory or other non-volatile solid-state memories. In some examples, the memory 104 may further include a memory remotely disposed relative to the processor 102; and these remote memories may be connected to the mobile terminal 10 via a network. An example of the network includes, but not limited to, the Internet, an intranet, a local area network, a mobile communication network and a combination thereof.

The transmission device 106 is configured to receive or transmit data via one network. A specific example of the network may include a wireless network provided by the communication supplier of the mobile terminal 10. In an example, the transmission device 106 includes a Network Interface Controller (NIC) that may be connected to other network devices via a base station to communicate with the Internet. In an example, the transmission device 106 may be a Radio Frequency (RF) module that is configured to communicate with the Internet via a wireless manner.

The embodiment of the present disclosure provides a data transmission receiving method that runs on the above mobile terminal. FIG. 2 is a flowchart of a data transmission receiving method according to an embodiment of the present disclosure. As shown in FIG. 2, the process may include the following steps.

At S202, a second communication node receives one or more PDCCHs from a first communication node, wherein when the second communication node receives multiple PDCCHs, PDSCHs indicated by the multiple PDCCHs are located in the same serving cell, and the indicated PDSCHs have the same time domain end position and different time domain start positions.

In an embodiment, the second communication node determines time domain positions of the indicated PDSCHs according to a first PDCCH in the multiple PDCCHs; and when the PDSCHs indicated by the multiple PDCCHs have different frequency domain positions, the second communication node replaces a frequency domain indication of a second PDCCH with a frequency domain indication of the first PDCCH within a time domain indication range indicated by the first PDCCH in the PDCCHs; and a time domain start moment of the PDSCH indicated by the first PDCCH is later than that of a PDSCH indicated by the second PDCCH.

Specifically, FIG. 3 is a structural diagram for data transmission according to an embodiment of the present disclosure. As shown in FIG. 3, the first communication node may receive the PDCCH at four time domain positions, namely subframes 1, 2, 3 and 4. It is assumed that the second communication node receives the PDCCH (represent by PDCCH-1 in the figure) at the subframe 1, and indicates that corresponding PDSCHs are received at the subframes 1, 2, 3 and 4, and resource blocks occupied by the PDSCHs are resource blocks 1, 2, 5 and 6. Due to changes of channels, in order to ensure the reliability of the PDCCH, the second communication node receives the PDCCH (represent by PDCCH-2 in the figure) at the subframe 2, and indicates that the PDSCHs are sent at the subframes 2, 3 and 4, resource blocks occupied by the PDSCHs are resource blocks 1, 2, 5 and 6, and the PDCCH (represent by PDCCH-3 in the figure) is sent at the subframe 3. In addition, the second communication node does not send the PDCCH at the subframe 4, and indicates that the PDSCHs are sent at the subframes 3 and 4, and resource blocks occupied by the PDSCHs are resource blocks 1, 2, 5, 6, 9 and 10. Supposing that the second communication node successfully detects the PDCCH-1, PDCCH-2 and PDCCH-3, the time domain position of the PDSCH is determined according to the PDCCH-1. As the PDCCH-3 belongs to the later sent PDCCH and the frequency domain position information indicated by the PDCCH-3 is different from that of each of the PDCCH-1 and the PDCCH-2, the determination is made according to the time domain indication range of the PDCCH-3, i.e., the subframe 3 and the subframe 4. The frequency domain positions of the PDSCHs in the subframe 3 and the subframe 4 are determined according to the frequency domain indication of the PDCCH-3. That is, the frequency domain indication of the PDCCH-3 replaces that of each of the PDCCH-1 and the PDCCH-2. The frequency domain indications of the subframe 1 and the subframe 2 may be determined according to the PDCCH-1 because the PDCCH-1 and the PDCCH-2 have the same frequency domain indication.

Specifically, the occupied frequency domain position of the PDSCH indicated by the PDCCH-3 is different from that of the PDCCH-1/PDCCH-2. If the occupied frequency domain position of the PDSCH indicated by the PDCCH-3 is different from that of the PDCCH-1/PDCCH-2, the second communication node determines the time domain position and the frequency domain position according to the first PDCCH.

In an embodiment, the operation that the second communication node receives the multiple PDCCHs from the first communication node may include that: the second communication node receives, through multiple TTIs, a PDSCH indicated by at least one PDCCH in the multiple PDCCHs. The second communication node receives one transport block on each TTI, or, the second communication node receives one or more redundancy versions of the same transport block on the multiple TTIs.

In an embodiment, the operation that the second communication node receives one PDCCH from the first communication node may further include that: the second communication node receives, through multiple TTIs, a PDSCH indicated by the PDCCH. The second communication node receives one transport block on each TTI, or, the second communication node receives one redundancy version of the same transport block on each TTI.

In an embodiment, when the PDCCH includes an indication for indicating whether to receive a demodulation pilot signal on the TTI, the second communication node receives the demodulation pilot signal on a last odd number of TTI, or, when the PDCCH includes the indication for indicating whether to receive the demodulation pilot signal on the TTI, the second communication node receives the demodulation pilot signal on a last first TTI; and when the second communication node receives different redundancy versions of the same transport block on the multiple TTIs, the second communication node receives data of a redundancy version 0 on the last first TTI, and correspondingly, when the PDCCH includes a redundancy version indication of the TTI, the second communication node receives the data of the redundancy version 0 sent on the last first TTI.

Specifically, when the PDCCH includes an indication on whether the demodulation pilot signal is sent on the TTI, the PDCCH always indicates that the demodulation pilot signal is sent on the last first TTI. In an embodiment, the operation that when the second communication node receives, through one TTI, the PDSCH indicated by the PDCCH, the second communication node receives one PDCCH from the first communication node may further include that: in a case where the PDCCH includes the indication for indicating whether to receive the demodulation pilot signal on the TTI, the second communication node receives the demodulation signal on the TTI; or, when the PDCCH includes the redundancy version indication of the TTI, the second communication node receives a redundancy version of data on the TTI.

Compared with a case where the traditional data of the pilot frequency or redundancy version 0 is always sent in the front TTI, the solution may effectively overcome the problem that the data of the pilot frequency or redundancy version 0 is lost due to leak detection of the PDCCH, thereby improving the detection performance of the PDSCH.

In an embodiment, when the second communication node detects that an SRS trigger in control information carried in the PDCCH is enabled, the second communication node increases an offset value at a time domain end position of a PDSCH indicated by the detected PDCCH to obtain a preset time domain position, the offset value being the number of time domain units predetermined by the first communication node and the second communication node; and when the second communication node determines that the time is greater than the preset time domain position, the second communication node specifies that the SRS signal is sent on a first effective SRS resource in the serving cell.

In an embodiment, the operation that the second communication node specifies that the SRS signal is sent on the first effective SRS resource in the serving cell may include that: the second communication node determines whether an indication for requiring to send an SRS signal of a special beam is received; if yes, the second communication node specifies the special beam to correspondingly send the SRS signal on an SRS resource in the serving cell; and if no, the second communication node selects, according to a time sending sequence for SRS resources in the serving cell, the first effective SRS resource in the time sending sequence to send the SRS signal.

In an embodiment, the operation that the second communication node specifies that the SRS signal is sent on the first effective SRS resource in the serving cell may include that: the second communication node determines whether an indication for requiring to send an SRS signal of a special antenna port is received; if yes, the second communication node specifies the special antenna port to correspondingly send the SRS signal on an SRS resource in the serving cell; and if no, the second communication node selects, according to a time sending sequence for SRS resources in the serving cell, the first effective SRS resource in the time sending sequence to send the SRS signal.

Specifically, in the above examples, supposing that an SRS trigger field of the PDCCH requires the second communication node to send the SRS signal, the second communication node increases, by taking a time domain end position of a PDSCH indicated by a successfully detected PDCCH as a reference, one offset value (the offset value is a positive integer known to the first communication node and the second communication node) on the basis of the reference, has the time greater than the (reference+offset), and specifies that the SRS signal is sent on a first available SRS resource of the serving cell (the first communication node has configured the SRS resource for the second communication node on the serving cell in advance). Therefore, no matter whether the successfully detected PDCCH of the second communication node is the PDCCH-1, or the PDCCH-2, or the PDCCH-3 or a combination thereof, the position of the second communication node for sending the SRS signal is the same, thereby avoiding the fuzzy problem of the first communication node for detecting the SRS signal. In addition, in some scenarios, when it is determined that the first available SRS resource exists, other conditions may further need to be met: the time is greater than the (reference+offset), and it is specified that the serving cell includes multiple SRS resources that are the resource 1, the resource 2 and the like according to a time sequence, the resource 1 being used for the beam 1, and the resource 2 being used for the beam 2. Supposing that the second communication node further receives other indications for requiring to send the SRS signal of the beam 2, the second communication node should send the SRS signal on the resource 2.

In an embodiment, when the second communication node detects that a CSI trigger in control information carried in the PDCCH is enabled, the second communication node increases an offset value at a time domain end position of a PDSCH indicated by the detected PDCCH to obtain a preset time domain position, the offset value being the number of time domain units predetermined by the first communication node and the second communication node; and when the second communication node determines that the time is greater than the preset time domain position, the second communication node specifies that CSI is reported on a first effective CSI reporting resource in the serving cell.

In an embodiment, the operation that the second communication node specifies that the CSI is reported on the first effective CSI resource in the serving cell may further include that: the second communication node determines whether an indication for requiring to send a CSI signal of a special beam is received; if yes, the second communication node specifies the special beam to correspondingly report the CSI on a CSI resource in the serving cell; and if no, the second communication node selects, according to a time sending sequence for CSI resources in the serving cell, the first effective CSI resource in the time sending sequence to report the CSI.

Specifically, in the above example, supposing that an SRS trigger field of the PDCCH requires the second communication node to report the CSI, the second communication node increases, by taking a time domain end position of a PDSCH indicated by a successfully detected PDCCH as a reference, one offset value (the offset value is a positive integer known to the first communication node and the second communication node) on the basis of the reference, has the time greater than the (reference+offset), and specifies that the CSI is reported on a first available CSI resource of the serving cell (the first communication node has configured the CSI resource for the second communication node on the serving cell in advance). Therefore, no matter whether the successfully detected PDCCH of the second communication node is the PDCCH-1, or the PDCCH-2, or the PDCCH-3 or a combination thereof, the position of the second communication node for reporting the CSI is the same, thereby avoiding the fuzzy problem of the first communication node for detecting the CSI information. In addition, in some scenarios, when it is determined that the first available CSI resource exists, other conditions may further need to be met: the time is greater than the (reference+offset), and it is specified that the serving cell includes multiple CSI resources that are the resource 1, the resource 2 and the like according to a time sequence, the resource 1 being used for the beam 1, and the resource 2 being used for the beam 2. Supposing that the second communication node further receives other indications for requiring to send the CSI signal of the beam 2, the second communication node should send the CSI signal on the resource 2.

Specifically, the above-mentioned TTI at least includes: a time subslot, a time slot or a subframe. The above parameters further serve as basic time domain units for the time domain positions. The time domain end position of the PDSCH at least includes: a symbol where the time domain end position of the PDSCH is located, a time subslot where the time domain end position of the PDSCH is located, a time slot where the time domain end position of the PDSCH is located or a subframe where the time domain end position of the PDSCH is located.

Specifically, the first communication node includes: a base station, and the second communication node includes: a terminal. Certainly, other devices capable of implementing the functions of the first communication node or the second communication node also fall within the protection scope of the embodiment, and will not be elaborated herein.

By means of the above-mentioned descriptions on the implementation manner, the person skilled in the art may clearly understand that the present disclosure may be implemented by software plus a necessary universal hardware platform, and may also be implemented by hardware certainly, but under most conditions, the former is a better implementation manner. Based on such an understanding, the technical solutions of the present disclosure essentially, or the part contributing to the conventional art may be implemented in a form of a software product. The computer software product is stored in a storage medium (such as a Read Only Memory (ROM)/Random Access Memory (RAM), a magnetic disk, and an optical disc) and includes a plurality of instructions for instructing a terminal device (which may be a mobile phone, a computer, a server, or a network device, etc.) to execute the methods described in the embodiments of the present disclosure.

Embodiment 2

The embodiment provides a data transmission sending method that runs on the above mobile terminal. A content that has been described will no longer be repeated. FIG. 4 is a flowchart of a data transmission sending method according to an embodiment of the present disclosure. As shown in FIG. 4, the process may include the following steps.

At S402, a first communication node respectively sends one or more PDCCHs to a second communication node at multiple candidate time domain positions, wherein when the first communication node sends multiple PDCCHs, PDSCHs indicated by the multiple PDCCHs are located in the same serving cell, and the PDSCHs indicated by the multiple PDCCHs have the same time domain end position and different time domain start positions.

In an embodiment, the PDSCHs indicated by the multiple PDCCHs have the same time domain end position, and a frequency domain end position of a PDSCH indicated by a first PDCCH in the multiple PDCCHs is not smaller than that of a PDSCH indicated by a second PDCCH in the multiple PDCCHs; and a time domain start moment of the PDSCH indicated by the first PDCCH is later than that of the PDSCH indicated by the second PDCCH.

Specifically, as shown in FIG. 3, the first communication node may send the PDCCH at four candidate time domain positions, namely subframes 1, 2, 3 and 4. It is assumed that the first communication node sends the PDCCH (represent by PDCCH-1 in the figure) at the subframe 1, and indicates that corresponding PDSCHs are sent at the subframes 1, 2, 3 and 4, and resource blocks occupied by the PDSCHs are resource blocks 1, 2, 5 and 6. Due to changes of channels, in order to ensure the reliability of the PDCCH, the first communication node sends the PDCCH (represent by PDCCH-2 in the figure) at the subframe 2, and indicates that the PDSCHs are sent at the subframes 2, 3 and 4, resource blocks occupied by the PDSCHs are resource blocks 1, 2, 5 and 6, and the PDCCH (represent by PDCCH-3 in the figure) is sent at the subframe 3. In addition, the first communication node does not send the PDCCH at the subframe 4, and indicates that the PDSCHs are sent at the subframes 3 and 4, and resource blocks occupied by the PDSCHs are resource blocks 1, 2, 5, 6, 9 and 10.

In an embodiment, the operation that the first communication node respectively sends multiple PDCCHs to the second communication node at the time domain positions may include that: the first communication node at least sends, on multiple TTIs, a PDSCH indicated by a first sent PDCCH in the PDCCHs, the first communication node sending one transport block on each TTI, or, the first communication node receiving one or more redundancy versions of the same transport block on the multiple TTIs.

In an embodiment, the first communication node at least sends, on the multiple TTIs, the PDSCH indicated by the first sent PDCCH in the PDCCHs, the first communication node sending one transport block on each TTI, or, the first communication node sending one or more redundancy versions of the same transport block on the multiple TTIs.

Specifically, it is to be noted that the selection on whether the first communication node sends one transport block on each TTI or the first communication node sends one redundancy version of the same transport block on each TTI should be agreed by the first communication node and the second communication node in advance.

In an embodiment, the operation that the first communication node respectively sends one PDCCH to the second communication node at the time domain positions may include that: the first communication node sends, on multiple TTIs, a PDSCH indicated by the PDCCH, the first communication node sending one transport block on the TTIs, or, the first communication node sending one redundancy version of the same transport block on each TTI.

In an embodiment, when the PDCCH includes an indication for indicating whether to send a demodulation pilot signal on the TTI, the first communication node sends the demodulation pilot signal on a last odd number of TTI; or, when the PDCCH includes the indication for indicating whether to send the demodulation pilot signal on the TTI, the first communication node sends the demodulation pilot signal on a last first TTI; or, when the first communication node sends different redundancy versions of the same transport block on the multiple TTIs, the first communication node sends data of a redundancy version 0 on the last first TTI; and correspondingly, when the PDCCH includes a redundancy version indication of the TTI, the first communication node sends the data of the redundancy version 0 on the last first TTI; or, when the first communication node sends one transport block on the TTI, and correspondingly, when the PDCCH includes the redundancy version indication of the TTI, the first communication node sends the data of the redundancy version 0 on each TTI.

Specifically, when the PDCCH includes the indication on whether the demodulation pilot signal is sent on the TTI, the PDCCH always indicates that the demodulation pilot signal is sent on the last first TTI.

Specifically, when the PDCCH includes the indication on whether the demodulation pilot signal is sent on the TTI, the PDCCH may further indicate that the demodulation pilot signal is sent simultaneously by a last odd number of TTI such as a last first TTI and a last third TTI.

In an embodiment, the number of TTIs occupied by a PDSCH indicated by a third PDCCH in the multiple PDCCHs is smaller than the number of TTIs occupied by a PDSCH indicated by a fourth PDCCH in the multiple PDCCHs, and a time domain start moment of the PDSCH indicated by the third PDCCH is later than that of the PDSCH indicated by the fourth PDCCH.

In an embodiment, when the PDSCH is sent in K TTIs, the PDCCH is sent in the K TTIs. The indicated PDSCH is sent in a (K+1−k)th TTI of the PDCCH with k TTIs included, the k being a positive integer not greater than the K and not smaller than 1.

Specifically, it is assumed that the PDSCH is sent in K (the K is a positive integer greater than 1) TTIs, and the K TTIs are marked as: TTI 1, TTI 2, TTI 3, . . . , TTI K.

In an embodiment, DCI carried in each PDDCH of the multiple PDCCHs is provided with an SRS trigger field, or the DCI carried in each PDDCH of the multiple PDCCHs is provided with a CSI trigger field.

Embodiment 3

The embodiment further provides an information transmission receiving apparatus for implementing the above-mentioned embodiments and implementation manners. A content that has been described will no longer be repeated. As used below, the term "module" may implement a combination of software and/or hardware having a predetermined function. Although the apparatus described in the following embodiments is implemented by software preferably, the implementation of hardware or a combination of the software and the hardware may also be conceivable.

Figure 5:
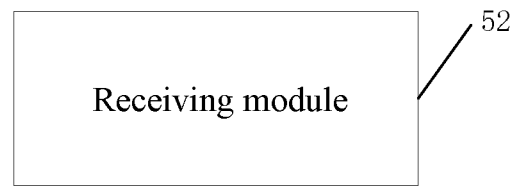
FIG. 5 is a structural block diagram of a data transmission receiving apparatus according to an embodiment of the present disclosure.

FIG. 5 is a structural block diagram of a data transmission receiving apparatus according to an embodiment of the present disclosure. As shown in FIG. 5, the apparatus may include a receiving module 52.

The receiving module 52 is configured to receive one or more PDCCHs from a first communication node, wherein when the second communication node receives multiple PDCCHs, PDSCHs indicated by the multiple PDCCHs are located in the same serving cell, and the indicated PDSCHs have the same time domain end position and different time domain start positions.

In an embodiment, the apparatus may further include a determination module. The determination module is configured to determine time domain positions of the indicated PDSCHs according to a first PDCCH in the multiple PDCCHs. When the PDSCHs indicated by the multiple PDCCHs have different frequency domain positions, the second communication node replaces a frequency domain indication of a second PDCCH with a frequency domain indication of the first PDCCH within a time domain indication range indicated by the first PDCCH in the PDCCHs. A time domain start moment of the PDSCH indicated by the first PDCCH is later than that of a PDSCH indicated by the second PDCCH.

In an embodiment, the receiving module 52 is further configured to: receive, through multiple TTIs, a PDSCH indicated by at least one PDCCH in the multiple PDCCHs; and receive one transport block on each TTI, or, receive one or more redundancy versions of the same transport block on the multiple TTIs.

In an embodiment, the receiving module 52 is further configured to: receive, through multiple TTIs, a PDSCH indicated by the PDCCH; and receive one transport block on each TTI, or, receive one redundancy version of the same transport block on each TTI.

In an embodiment, the receiving module 52 is further configured to: receive, when the PDCCH includes an indication for indicating whether to receive a demodulation pilot signal on the TTI, the demodulation pilot signal on a last odd number of TTI, or, receive, when the PDCCH includes the indication for indicating whether to receive the demodulation pilot signal on the TTI, the demodulation pilot signal on a last first TTI, or, receive, when different redundancy versions of the same transport block are received on the multiple TTIs, data of a redundancy version 0 on the last first TTI, and correspondingly, receive, when the PDCCH includes a redundancy version indication of the TTI, the data of the redundancy version 0 sent on the last first TTI.

In an embodiment, when receiving, through one TTI, the PDSCH indicated by the PDCCH, the receiving module 52 is further configured to: receive, in a case where the PDCCH includes the indication for indicating whether to receive the demodulation pilot signal on the TTI, the demodulation signal on the TTI; or, receive, when the PDCCH includes the redundancy version indication of the TTI, a redundancy version of data on the TTI.

In an embodiment, the apparatus is further configured to: increase, when detecting that an SRS trigger in control information carried in the PDCCH is enabled, an offset value at a time domain end position of a PDSCH indicated by the detected PDCCH to obtain a preset time domain position, the offset value being the number of time domain units predetermined by the first communication node and the apparatus; and specify, when determining that the time is greater than the preset time domain position, that the SRS signal is sent on a first effective SRS resource in the serving cell.

In an embodiment, the apparatus is further configured to: increase, when detecting that a CSI trigger in control information carried in the PDCCH is enabled, an offset value at a time domain end position of a PDSCH indicated by the detected PDCCH to obtain a preset time domain position, the offset value being the number of time domain units predetermined by the first communication node and the apparatus; and specify, when determining that the time is greater than the preset time domain position, that the CSI is reported on a first effective CSI resource in the serving cell.

It is to be noted that each module may be implemented by software or hardware. The latter may be implemented via the following manner but is not limited thereto: the above modules are located in the same processor; or the above modules are respectively located in different processors in any combined form.

Embodiment 4

The embodiment further provides an information transmission receiving apparatus for implementing the above-mentioned embodiments and implementation manners. A content that has been described will no longer be repeated. As used below, the term "module" may implement a combination of software and/or hardware having a predetermined function. Although the apparatus described in the following embodiments is implemented by software preferably, the implementation of hardware or a combination of the software and the hardware may also be conceivable.

Figure 6:
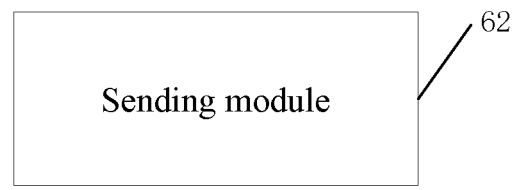
FIG. 6 is a structural block diagram of a data transmission sending apparatus according to an embodiment of the present disclosure.

FIG. 6 is a structural block diagram of a data transmission sending apparatus according to an embodiment of the present disclosure. As shown in FIG. 6, the apparatus may include: a sending module 62.

The sending module 62 is configured to respectively send one or more PDCCHs to a second communication node at multiple candidate time domain positions, wherein when the first communication node sends multiple PDCCHs, PDSCHs indicated by the multiple PDCCHs are located in the same serving cell, and the PDSCHs indicated by the multiple PDCCHs have the same time domain end position and different time domain start positions.

In an embodiment, the PDSCHs indicated by the multiple PDCCHs have the same time domain end position, and a frequency domain end position of a PDSCH indicated by a first PDCCH in the multiple PDCCHs is not smaller than that of a PDSCH indicated by a second PDCCH in the multiple PDCCHs; and a time domain start moment of the PDSCH indicated by the first PDCCH is later than that of the PDSCH indicated by the second PDCCH.

In an embodiment, the sending module 62 is further configured to: at least send, on multiple TTIs, a PDSCH indicated by a first sent PDCCH in the PDCCHs; and send one transport block on each TTI, or, send one or more redundancy versions of the same transport block on the multiple TTIs.

In an embodiment, the sending module 62 is further configured to: send, on multiple TTIs, a PDSCH indicated by the PDCCH, the first communication node sending one transport block on the TTIs, or, the first communication node sending one redundancy version of the same transport block on each TTI.

In an embodiment, the apparatus is further configured to: send, when the PDCCH includes an indication for indicating whether to send a demodulation pilot signal on the TTI, the demodulation pilot signal on a last odd number of TTI; or, send, when the PDCCH includes the indication for indicating whether to send the demodulation pilot signal on the TTI, the demodulation pilot signal on a last first TTI; or, send, when the first communication node sends different redundancy versions of the same transport block on the multiple TTIs, data of a redundancy version 0 on the last first TTI; and correspondingly, send, when the PDCCH includes a redundancy version indication of the TTI, the data of the redundancy version 0 on the last first TTI; or, send, when the first communication node sends one transport block on each TTI, and correspondingly, when the PDCCH includes the redundancy version indication of the TTI, the data of the redundancy version 0 on each TTI.

In an embodiment, the number of TTIs occupied by a PDSCH indicated by a third PDCCH in the multiple PDCCHs is smaller than the number of TTIs occupied by a PDSCH indicated by a fourth PDCCH in the multiple PDCCHs, and a time domain start moment of the PDSCH indicated by the third PDCCH is later than that of the PDSCH indicated by the fourth PDCCH.

In an embodiment, when the PDSCH is sent in K TTIs, the PDCCH is sent in the K TTIs. The indicated PDSCH is sent in a (K+1−k)th TTI of the PDCCH with k TTIs included, the k being a positive integer not greater than the K and not smaller than 1.

In an embodiment, DCI carried in each PDDCH of the multiple PDCCHs is provided with an SRS trigger field, or the DCI carried in each PDDCH of the multiple PDCCHs is provided with a CSI trigger field.

Embodiment 5

The PDCCH/Short Physical Downlink Control Channel (SPDCCH) schedules the PDSCH to be repeatedly transmitted in multiple TTIs, and the number of repeated transmission times is determined by a bit domain indication in the DCI. The number-of-repetition-times indication may be an independent bit domain indication, or an reinterpretation for existing bit domains. X bits are used to indicate 2x numbers of repetition times at most. Due to changes of channels, in order to ensure the reliability of the PDCCH/SPDCCH, the PDCCH/SPDCCH may also be sent in a repeated transmission process of the PDSCH to indicate the number of rest repetition times of the PDSCH. Specifically, PDSCHs indicated by multiple PDCCHs are located in the same serving cell, and have the same time domain end position, so at least the PDSCH indicated by the first PDCCH is sent on multiple TTIs, and one redundancy version of the same transport block is sent on the multiple TTIs.

In an embodiment, the 1 bit is used to indicate one of the numbers of repetition times [1,2]; or the 2 bits is used to indicate one of the numbers of repetition times [1, 2, 3, 4], or one of [1, 2, 3, 6], or one of [1, 2, 4, 8].

One indication manner is: when it is indicated that 2x numbers of repetition times are not continuous positive integers, the PDCCH/SPDCCH can only be sent at a part of positions in repeated transmission of the PDCCH. Supposing that the number of repetition times for the PDSCH indicated by the first PDECCH is K times, and generally, supposing that the PDSCH is sent on 1st, 2nd, . . . , Kth TTIs, it is indicated that the PDCCH of which the number of repetition times is k is sent on the (K+1−k)th TTI (k<K and the k is discontinuous positive integers). Supposing [1, 2, 4, 8], the PDCCH/SPDCCH can only be sent at the 1st, 5th, 7th and 8th time in the repeated transmission of the PDSCH.

Another indication manner is: when it is indicated that 2x numbers of repetition times are continuous positive integers, the PDCCH/SPDCCH may be sent at any position in repeated transmission of the PDCCH. Supposing that the number of repetition times for the PDSCH indicated by the first PDECCH is K times, and generally, supposing that the PDSCH is sent on the 1st, 2nd, . . . , Kth TTI, it is indicated that the PDCCH of which the number of repetition times is k is sent on the (K+1−k)th TTI (k<K and the k is discontinuous positive integers). Supposing [1, 2, 3, 4], the PDCCH/SPDCCH may be sent at the 1st, 2nd, 3rd and 4th time in the repeated transmission of the PDSCH.

The following advantages are achieved: the PDCCH may be sent in the TTI when the PDSCH is sent, such that while the reliability of the PDCCH/SPDCCH is ensured, the changes of wireless channels may be better adapted.

In an embodiment, the x bits is the reinterpretation for the bit domains in the relevant art, for example: in the process number indication of 4 bits, the 2 bits indicate 4 processes at most, and the 2 bits indicate the number of repetition times. Also for example: the redundancy version of the 2 bit indicates the number of repetition times, and the redundancy version used by the service channel is RV0. Also for example: whether the SPDCCH resource of the 2 bit is reused to indicate the number of repetition times. In this case, the SPDCCH remaining resources are not reused at default; and meanwhile, the higher-level configuration enables an SPDCCH reuse indication on the physical layer and the higher-level configuration enables simultaneous configuration or equivalence during the repeated transmission of the PDSCH.

By means of the embodiment, the number of repetition times may be dynamically determined during the repeated transmission of the PDSCH. The number of repetition times is indicated by the independent bit domain or the reuse of the bit domain in the relevant art and the reinterpretation. Compared with a case where the number of repetition times is configured semi-statically, the method ensures the reliable performance and improves the spectral efficiency.

Embodiment 6

The PDCCH/SPDCCH schedules the PDSCH to be repeatedly transmitted in multiple TTIs, and the number of repeated transmission times is determined by the number of repetition times in the DCI. The number-of-repetition-times indication may be an independent bit domain indication, or an reinterpretation of the bit domain in the relevant art. X bits are used to indicate 2x numbers of repetition times at most. Due to changes of channels, in order to ensure the reliability of the PDCCH/SPDCCH, the PDCCH/SPDCCH may also be sent in repeated transmission of the PDSCH to indicate the number of rest repetition times of the PDSCH.

When 1 bit in the DCI indicates that a Demodulation Reference Signal (DMRS) position indicator is repeatedly transmitted, either of the following manners is used:

(1) 1 is always indicated, i.e., the DMRS always exists. Or, the DMRS always exists, and the 1 bit is reserved when PDSCH Repetition is enabled.

(2) The 1 bit indicates either pattern, one pattern being that each repeatedly transmitted TTI has the DMRS, and the other pattern being that from the repeatedly transmitted last TTI to the front, a sequence of having the DMRS, having no DMRS, having the DMRS and having no DMRS is provided. For example, two patterns indicated by the 1 bit at different numbers of repetition times are as follows respectively: in case of k=1, the 1 bit indicates that the DMRS is provided or not provided; in case of k=2, the 1 bit indicates either pattern, the Pattern1 being RR, i.e., the two TTIs having the DMRS, and the Pattern2 being DR, i.e., the two TTIs being that the first TTI is provided with the DMRS, and the second TTI is not provided with the DMRS; and in case of k=3, the 1 bit indicates either pattern, the Pattern1 being RRR, i.e., the three TTIs being provided with the DMRS, and the Pattern2 being RDR, i.e., the second TTI in the three TTIs being not provided with the DMRS, and the first and third TTIs being provided with the DMRS.

By means of the embodiment, the pilot overhead during repeated transmission is saved, and in case of leak detection of the PDCCH, the presence of the reference signal demodulated data is ensured.

Embodiment 7

The PDCCH/SPDCCH schedules the PDSCH to be repeatedly transmitted in multiple TTIs, and the number of repeated transmission times is determined by the number of repetition times in the DCI. The number-of-repetition-times indication may be an independent bit domain indication, or an reinterpretation for existing bit domains. X bits are used to indicate 2x numbers of repetition times at most. Due to changes of channels, in order to ensure the reliability of the PDCCH/SPDCCH, the PDCCH/SPDCCH may also be sent in repeated transmission of the PDSCH to indicate the number of rest repetition times of the PDSCH.

When a Downlink Assignment Index (DAI) domain in the DCI is repeatedly transmitted, either of the following manners is used:

(1) The use manner of the DAI is determined according to the number of times in the number-of-repetition-times indication. In case of k>1, the DAI is reserved. That is, the DAI domain is not used during repeated transmission, i.e., the terminal does not expect to receive the repeated transmission of more than one time in a Hybrid Automatic Repeat reQuest (HARQ) feedback window.

(2) The use manner of the DAI is determined according to whether PDSCH Repetition is enabled. When the PDSCH Repetition is enabled, the DAI is reserved. That is, the DAI domain is not used during repeated transmission, i.e., the terminal does not expect to receive the repeated transmission of more than one time in an HARQ feedback window.

By means of the embodiment, the number of PDSCHs that need to be fed back may be prevented from being ambiguous during repeated transmission of a Time Division Duplex (TDD) system, i.e., only one time of repeated transmission is always supported in the HARQ feedback window.

Embodiment 8

Figure 7:
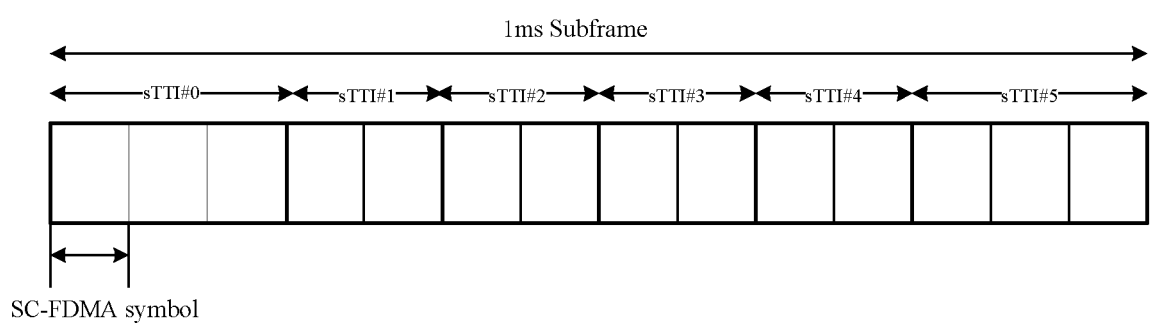
FIG. 7 is a schematic diagram of a subslot Transmission Time Interval (TTI) division manner corresponding to a length of a 1 ms subframe according to an embodiment of the present disclosure.

The 5th Generation mobile communication technology (5G) will support novel communication scenarios with a higher rate (Gbps), massive links (1M/Km2), an ultra-low latency (1 ms), a higher reliability and a hundredfold energy efficiency improvement, etc. In order to achieve the ultra-low latency, one method for effectively implementing the ultra-low latency is to reduce the TTI of the system, thereby reducing the latency of a unidirectional link exponentially. The TTI serves as a basic unit of the time domain in downlink or uplink transmission scheduling. With the reduction in the length of the TTI, both the downlink demodulation pilot pattern and the position are subjected to change. FIG. 7 is a schematic diagram of a subslot TTI division manner corresponding to a length of a 1 ms subframe according to an embodiment of the present disclosure. As shown in FIG. 7, the length of the 1 ms subframe corresponds to the subslot TTI division manner. In the following embodiments, the subslot TTI is abbreviated as the sTTI.

Figure 8:
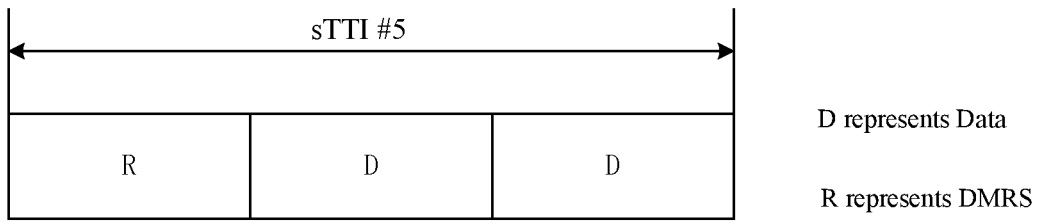
FIG. 8 is a schematic diagram of a Demodulation Reference Signal (DMRS) pattern of sTTI #5 in the relevant art.

At present, the DMRS pattern "R D D" is provided for the sTTI #5. FIG. 8 is a schematic diagram of a DMRS pattern of an sTTI #5 in the relevant art. As shown in FIG. 8, the terminal sends the DMRS at the first symbol of the sTTI #5, and sends the data at the last two symbols. However, when the base station notifies the terminal of that the last symbol of the sTTI #5 is a Cell-Specific SRS configuration (i.e., on the last symbol of the sTTI #5, the base station configures a resource capable of sending the SRS signal), what pilot pattern is configured by the base station for the terminal is a problem to be solved urgently.

In order to solve the above problem, one DMRS pattern is: the base station notifies, via the PDCCH, the terminal UE1 of that the DMRS pattern of the sTTI #5 is "R D_". Upon the reception of the DMRS pattern, the UE1 sends the DMRS on the first symbol of the sTTI #5, sends the data on the second symbol, and does not send the Physical Uplink Shared Channel (PUSCH) and DMRS signal on the last symbol.

Another DMRS pattern is: the base station notifies, via the PDCCH, the terminal UE1 of that the DMRS pattern of the sTTI #5 is "D R_". Upon the reception of the DMRS pattern, the UE1 sends the data on the first symbol of the sTTI #5, sends the DMRS on the second symbol, and does not send the PUSCH and DMRS signal on the last symbol.

By means of the embodiment, when another terminal sends a UE-Specific SRS on the third symbol of the sTTI #5, the terminal UE1 does not send the PUSCH and DMRS on the third symbol of the sTTI #5, thereby preventing the interference to the SRS signal of the another terminal.

Embodiment 9

For the existing DMRS pattern "R D D" of the sTTI #5, when the base station notifies the terminal of that the last symbol of the sTTI #5 is the Cell-Specific SRS configuration, the terminal can only send data of one symbol. As a result, with the same Transport Block size (TB size), while the number of available symbols is reduced, the terminal must use a high bit rate to reduce the reliability of uplink data. Or with the same modulation order and bit rate, while the number of available symbols is reduced, the transmission TB size of the terminal is reduced, and the spectral efficiency is reduced.

Figure 9:
FIG. 9 is a schematic diagram of a DMRS pattern of sTTI #5 according to an embodiment of the present disclosure.

In order to solve the above problem, one DMRS pattern is: the base station notifies, via the PDCCH, the terminal UE1 of that the DMRS pattern of the sTTI #5 is "D D_". FIG. 9 is a schematic diagram of a DMRS pattern of sTTI #5 according to an embodiment of the present disclosure. As shown in FIG. 9, upon the reception of the DMRS pattern, the UE1 sends the data on front two symbols of the sTTI #5, and does not send the PUSCH and DMRS signal on the last symbol.

Specifically, when the UE1 receives the DMRS pattern shown in FIG. 2(b) and notified by the base station on the sTTI #5, the DMRS for demodulating the data of the sTTI #5 is certainly located on the sTTI #4, i.e., the sTTI #4 uses the DMRS pilot pattern of "D R" or "R D".

By means of the embodiment, on the premise of the same TB Size, two symbols (i.e., more time-frequency domain resources) are used to send the data, such that the terminal uses a relatively low bit rate to improve the reliability of uplink data. By means of the embodiment, on the premise of the same modulation order and bit rate, two symbols (i.e., more time-frequency domain resources) are used to send more data, such that the terminal has a larger transmission TB Size and a high spectral efficiency.

By means of the embodiment, when another terminal sends a UE-Specific SRS on the third symbol of the sTTI #5, the terminal UE1 does not send the PUSCH and DMRS on the third symbol of the sTTI #5, thereby preventing the interference to the SRS signal of the another terminal.

Embodiment 10

The embodiment provides a novel DMRS pattern "D D R" for the sTTI #5.

The base station notifies, via the PDCCH, the terminal UE1 of that the DMRS pattern of the TTI #5 is "D D R". Upon the reception of the pattern, the terminal sends the data on the front two symbols but needs to determine whether to send the DMRS on the last symbol. When the terminal determines that the DMRS on the last symbol is in conflict with the Cell-specific SRS configuration, the terminal does not send the DMRS on the last symbol. When the terminal determines that the DMRS on the last symbol is not in conflict with the Cell-specific SRS configuration, the terminal sends the DMRS on the last symbol.

Specifically, when the terminal determines that the DMRS on the last symbol is in conflict with the Cell-specific SRS configuration, the demodulation pilot DMRS of the data on the sTTI #5 is shared on the sTTI #4. When the DMRS on the last symbol is not in conflict with the Cell-specific SRS configuration, the DMRS of the data on the sTTI #5 is on the last symbol of the sTTI #5.

By means of the embodiment, on the premise of the same TB Size, two symbols (i.e., more time-frequency domain resources) are used to send the data, such that the terminal uses a relatively low bit rate to improve the reliability of uplink data. By means of the embodiment, on the premise of the same modulation order and bit rate, two symbols (i.e., more time-frequency domain resources) are used to send more data, such that the terminal has a larger transmission TB Size and a high spectral efficiency.

By means of the embodiment, when another terminal sends a UE-Specific SRS on the third symbol of the sTTI #5, the terminal UE1 does not send the PUSCH and DMRS on the third symbol of the sTTI #5, thereby preventing the interference to the SRS signal of the another terminal.

Embodiment 11

In wireless communication systems, the transmitting power state conversion time of the terminal transmitter includes a conversion process for the power of the transmitter from an on state to an off state (in Long Term Evolution (LTE) systems, the time for this process is about 20 μs) and a conversion process for the power of the transmitter from the on state to the off state (in the LTE systems, the time for this process is about 20 μs). While the length of the TTI is reduced, the power state conversion time is shortened from 20 μs to 10 μs; and according to different signal types for sending, the transmitting power conversion time template is also different.

According to the division manner for the sTTI shown in FIG. 7, concerning the sTTI #0, when the SRS is sent on the last symbol of the previous subframe n (i.e., the third symbol of the sTTI #5), the data D is sent on the first symbol of the later subframe n+1 (i.e., the first symbol of the sTTI #0), and the DMRS is sent on the second symbol of the sTTI #0 of the subframe n+1. That is, the base station notifies the terminal of that the DMRS pattern on the sTTI #0 is "D R D".

Figure 10:
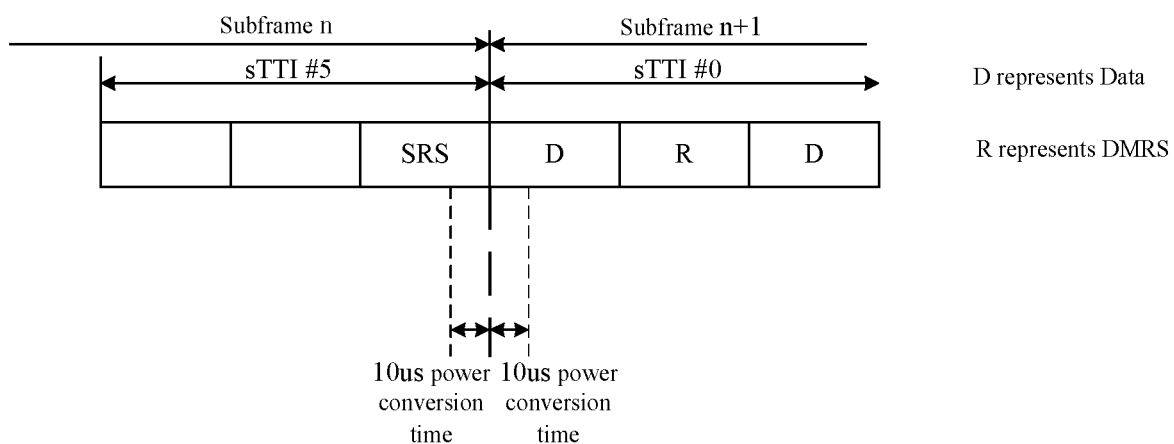
FIG. 10 is a schematic diagram of a DMRS pattern of sTTI #0 according to an embodiment of the present disclosure.

FIG. 10 is a schematic diagram of a DMRS pattern of sTTI #0 according to an embodiment of the present disclosure. As shown in FIG. 10, the DMRS pattern of the sTTI #0 is "D R D". According to the transmitting power conversion time template shown in FIG. 3, it can be seen that as the last symbol of the subframe n is the SRS, and the first symbol of the subframe n+1 is the data D, the transmitting power conversion time is averaged on the SRS and the data D, i.e., the power conversion time that the symbol for sending the SRS is occupied is 10 μs, and the time that the symbol for sending the data D is occupied is 10 μs. Hence, the impact on the rate for sending the data on the sTTI #0 is small.

Specifically, when the second symbol of the sTTI #0 sends the DMRS, the data demodulation rate may be improved. When the third symbol of the sTTI #0 sends the data D, the TB size may be improved or the reliability of data may be improved.

By means of the embodiment, when the base station notifies the terminal of that the DMRS pattern "D R D" shown in FIG. 3 is used on the sTTI #0, and when the SRS is sent on the last symbol of the previous subframe, the impact of the transmitting power conversion time on the data of the terminal is small, thereby achieving the reliability of protecting the terminal to send the uplink data.

Embodiment 12

For uplink and downlink configurations 6 of the TDD system, when the UE is configured with the short TTI, the transmission interval uses the time slot as the unit, and the transmitted PUSCH becomes slot-PUSCH. For the purpose of supporting that all uplink time slots or special subframes can be scheduled, an UL index is introduced. The index of a time slot where the scheduled PUSCH is located is respectively indicated by a Most Significant Bit (MSB) and a Least Significant Bit (LSB) in 2 bit. In an embodiment, as shown in Table 9, when the Special Subframe Configuration (SSC) is 0, 5 and 9, the 2-bit information in the UL index is set as follows to schedule the slot PUSCH.

In case of (MSB,LSB)='10', the time slot n schedules the PUSCH in the time slot n+k, the k having a value shown in the following table.

In case of (MSB,LSB)='01', the time slot n schedules the PUSCH in the time slot n+k+1, the k having a value shown in the following table.

In case of (MSB,LSB)='11', the time slot n schedules the PUSCH in the time slot n+k and the time slot n+k+1, the k having a value shown in the following Table 1.

TABLE 1

| TDD UL/DL Configuration | slot number n | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| 6(SSC 0, 5, 9) | 4 | 5 | 6 | | | | | | | | 4 | 4 | 4 | | | | | | | |

The description is made with the time slot n=2 as the example.

In case of (MSB,LSB)='10', the PUSCH in the time slot n+6, i.e., the PUSCH in the time slot 8, is scheduled.

In case of (MSB,LSB)='01', the PUSCH in the time slot n+6+1, i.e., the PUSCH in the time slot 9, is scheduled.

In case of (MSB,LSB)='11', the PUSCH in the time slot n+6 and the time slot n+6+1, i.e., the PUSCH in the time slot 8 and the time slot 9, is scheduled.

Embodiment 13

For uplink and downlink configurations 6 of the TDD system, when the UE is configured with the short TTI, the transmission interval uses the time slot as the unit, and the transmitted PUSCH becomes slot-PUSCH. For the purpose of supporting that all uplink time slots or special subframes can be scheduled, an UL index is introduced. The index of a time slot where the scheduled PUSCH is located is respectively indicated by an MSB and an LSB in 2 bit. In an embodiment, as shown in Table 10, when the SSC is 0, 5 and 9, the 2-bit information in the UL index is set as follows to schedule the slot PUSCH.

In case of (MSB,LSB)='10', the time slot n schedules the PUSCH in the time slot n+k, the k having a value shown in the following table.

In case of (MSB,LSB)='01', the time slot n schedules the PUSCH in the time slot n+k+1, the k having a value shown in the following table.

In case of (MSB,LSB)='11', the time slot n schedules the PUSCH in the time slot n+k and the time slot n+k+1, the k having a value shown in the following Table 2.

transmission interval uses the time slot as the unit, and the transmitted PUSCH becomes slot-PUSCH. For the purpose of supporting that all uplink time slots or special subframes can be scheduled, an UL index is introduced. The index of a time slot where the scheduled PUSCH is located is respectively indicated by an MSB and an LSB in 2 bit. In an embodiment, as shown in Table 11, when the SSC is 10, the 2-bit information in the UL index is set as follows to schedule the slot PUSCH.

For other time slots except for 0, 1, 10, 11, 12 and 19:

In case of (MSB,LSB)='10', the time slot n schedules the PUSCH in the time slot n+k, the k having a value shown in the following table.

In case of (MSB,LSB)='01', the time slot n schedules the PUSCH in the time slot n+k+1, the k having a value shown in the following table.

In case of (MSB,LSB)='11', the time slot n schedules the PUSCH in the time slot n+k and the time slot n+k+1, the k having a value shown in the following table.

For the time slot 2:

In case of (MSB,LSB)='10', the time slot n schedules the PUSCH in the time slot n+k, the k having a value shown in the following table.

In case of (MSB,LSB)='01', the time slot n schedules the PUSCH in the time slot n+k+1, the k having a value shown in the following table.

In case of (MSB,LSB)='00', the time slot n schedules the PUSCH in the time slot n+k+5, the k having a value shown in the following table.

In case of (MSB,LSB)='11', the time slot n schedules the PUSCH in the time slots n+k, n+k+1 and n+k+5, the k having a value shown in the following table.

TABLE 2

| TDD UL/DL Configuration | slot number n | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| 6(SSC 0, 5, 9) | 4 | 5 | 6 | | | | | | | | 4 | 4 | 4 | | | | | | | 5 |

The description is made with the time slot n=2 as the example.

In case of (MSB,LSB)='10', the PUSCH in the time slot n+6, i.e., the PUSCH in the time slot 8, is scheduled.

In case of (MSB,LSB)='01', the PUSCH in the time slot n+6+1, i.e., the PUSCH in the time slot 9, is scheduled.

In case of (MSB,LSB)='11', the PUSCH in the time slot n+6 and the time slot n+6+1, i.e., the PUSCH in the time slot 8 and the time slot 9, is scheduled.

Embodiment 14

For uplink and downlink configurations 6 of the TDD system, when the UE is configured with the short TTI, the Or, for the time slot 2:

In case of (MSB,LSB)='10', the time slot n schedules the PUSCH in the time slot n+k, the k having a value shown in the following table.

In case of (MSB,LSB)='01', the time slot n schedules the PUSCH in the time slot n+k+1, the k having a value shown in the following table.

In case of (MSB,LSB)='11', the time slot n schedules the PUSCH in the time slot n+k+5, the k having a value shown in the following table.

In case of (MSB,LSB)='00', the time slot n schedules the PUSCH in the time slots n+k, n+k+1 and n+k+5, the k having a value shown in the following Table 3.

TABLE 3

| TDD UL/DL Configuration | slot number n | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| 0(SSC 10) | 4 | 5 | 6 | | | | | | | | 4 | 4 | | | | | | | | 4 |

The description is made with the time slot n=1 as the example.

In case of (MSB,LSB)='10', the PUSCH in the time slot n+5, i.e., the PUSCH in the time slot 6, is scheduled.

In case of (MSB,LSB)='01', the PUSCH in the time slot n+5+1, i.e., the PUSCH in the time slot 7, is scheduled.

In case of (MSB,LSB)='11', the PUSCH in the time slot n+5 and the time slot n+5+1, i.e., the PUSCH in the time slot 6 and the time slot 7, is scheduled.

The description is made with the time slot n=2 as the example.

In case of (MSB,LSB)='10', the PUSCH in the time slot n+6, i.e., the PUSCH in the time slot 8, is scheduled.

In case of (MSB,LSB)='01', the PUSCH in the time slot n+6+1, i.e., the PUSCH in the time slot 9, is scheduled.

In case of (MSB,LSB)='11', the PUSCH in the time slot n+6+5, i.e., the PUSCH in the time slot 13, is scheduled.

In case of (MSB,LSB)='00', the PUSCH in the time slots n+6, n+6+1 and n+6+5, i.e., the PUSCH in the time slots 8, 9 and 13, is scheduled.

By determining the scheduling timing method in the embodiment, all downlink subframes and special subframes may flexibly schedule the PUSCH in two or more different time slots, and thus the downlink control overhead is balanced in each downlink time slot and special subframe.

Embodiment 15

The rule for allocating service time domain resources in the current 3rd Generation Partnership Project (3GPP) protocol is: Radio Resource Control (RRC) configures a table, each index row indication information of the table includes the number of slots deviated relative to the PDCCH during allocation of the service time domain resource, an indication value SLIV for a start symbol S and a length L for allocating the time domain resource, and a resource mapping type transmitted by a service; and through a time domain resource allocation domain in the PDCCH, the index row of the table is indicated. In the solution, the table configured by the RRC has a variety of potential states but the number of index rows included in the table is limited, which restricts the scheduling flexibility of the service resource in allocation.

The user terminal may configure the start position for allocating the service resource and the resource mapping type transmitted by the service, the time domain resource allocation domain of the PDCCH only needs to indicate the symbol length L for allocating the service resource, any slot is not stepped over during the allocation of the service resource, and the number of states for the length L that potentially needs to be indicated is limited; and with the same overhead for the time domain resource allocation domain, more flexible resource allocation and scheduling may be implemented.

One slot is composed of p symbols numbered 0 to p−1, the p being a positive integer. The non-slot is a resource allocation unit smaller than the slot, and one non-slot is composed of a symbols. The base station sends the PDCCH on the symbol n of the slot m, the UE receives the PDCCH on the symbol n of the slot m, and the UE starts to transmit corresponding services on the symbol n+x of the slot m or the symbol n+x+a−b of the slot m or the symbol 0 of the subsequent slot. The x is a default value or a valued configured by the RRC, the b is a remainder of (n+x)/a, and both the x and the b are a nonnegative integer. The length of the service time domain resource scheduled by the PDCCH is L symbols, 1≤L≤p, and the L being an integer. The L is indicated by the time domain resource allocation domain of the PDCCH, and the overhead occupied by the domain is q bits, q≤⌈log$_2$ p⌉ and being a nonnegative integer. When the time domain resource allocation domain is ⌈log$_2$ p⌉ bits, the value of the L is selected from any integer in a set [1,p]. When the time domain resource allocation domain is smaller than ⌈log$_2$ p⌉ bits, the value of the L is selected from any integer in a subset of the set [1,p].

When the time domain resource is allocated to the service of the UE, two solutions are provided.

Solution 1:

In case of n+x+L−1<p, the service time domain resource scheduled by the PDCCH is started from the symbol n+x of the slot m and ended at the symbol n+x+L−1 of the slot m.

In case of n+x+L−1≥p, the service time domain resource scheduled by the PDCCH is started from the symbol 0 of slot m+⌊(n+x+L−1)/p⌋ and ended at the symbol L−1 of slot m+⌊(n+x+L−1)/p⌋.

Solution 2:

In case of n+x+L−1+a−b<p, the service time domain resource scheduled by the PDCCH is started from the symbol n+x+a−b of the slot m and ended at the symbol n+x+L−1+a−b of the slot m.

In case of n+x+L−1+a−b≥p, the service time domain resource scheduled by the PDCCH is started from the symbol 0 of slot m+⌊(n+x+L−1+a−b)/p⌋ and ended at the symbol L−1 of slot m+⌊(n+x+L−1+a−b)/p⌋.

The solution 2 may address the alignment problem with the start symbol of the non-slot during the service resource allocation. When the symbol n+x is located in the middle of the non-slot, an offset a−b needs to be configured.

In the embodiment, p=14, a=4, and the q has a value selected from any value in the set {0, 1, 2, 3, 4}. When the time domain resource allocation domain q is 4, the L is selected from any value in the set {1, 2, 3, 4, 5, 6, 7, 8, 9, 10, 11, 12, 13, 14}. When the time domain resource allocation domain is smaller than 4 bits, the L is selected from any value in a subset of the set {1, 2, 3, 4, 5, 6, 7, 8, 9, 10, 11, 12, 13, 14}. In an embodiment, when the time domain resource domain is 0 bit, the L is 2; or in an embodiment, when the time domain resource domain is 1 bit, the L is selected from any value in the set {2,7}; or in an embodiment, when the time domain resource domain is 2 bits, the L is selected from any value in the set {2, 4, 7, 14} or {2, 4, 7}; or in an embodiment, when the time domain resource domain is 3 bits, the L is selected from any value in the set {1, 2, 4, 7, 8, 10, 12, 14}.

When the time domain resource is allocated to the service of the UE, two solutions are provided.

Solution 1:

In case of n+x+L−1<14, the service time domain resource scheduled by the PDCCH is started from the symbol n+x of the slot m and ended at the symbol n+x+L−1 of the slot m.

In case of n+x+L−1≥14, the service time domain resource scheduled by the PDCCH is started from the symbol 0 of slot m+⌊(n+x+L−1)/14⌋ and ended at the symbol L−1 of slot m+⌊(n+x+L−1)/14⌋.

Solution 2:

In case of n+x+L+3−b<14, the service time domain resource scheduled by the PDCCH is started from the symbol n+x+4−b of the slot m and ended at the symbol n+x+L+3−b of the slot m.

In case of n+x+L+3−b≥14, the service time domain resource scheduled by the PDCCH is started from the symbol 0 of slot m+⌊(n+x+L+3−b)/14⌋ and ended at the symbol L−1 of slot m+⌊(n+x+L+3−b)/14⌋.

The solution 2 may address the alignment problem with the start symbol of the non-slot during the service resource allocation. When the symbol n+x is located in the middle of the non-slot composed of four symbols, an offset 4−b needs to be configured.

According to the current 3GPP protocol, in case of p=14, the overhead of the time domain resource allocation for the service may be 0, 1, 2, 3 or 4 bits. However, the limited states of the time domain resource allocation domain needs to indicate an RRC index, the index row indication information of the table configured by the RRC includes the number of slots deviated relative to the PDCCH during the allocation of the service time domain resource, the indication value SLIV for the start symbol S and the length L in the time domain resource allocation, and the resource mapping type transmitted by the service, and the number of states is enormous, which restricts the flexibility during the time domain resource allocation. By means of the solutions in the embodiment, with the same overhead for the time domain resource allocation domain of the PDCCH, the time domain resource allocation indication of the service is more flexible.

Embodiment 16

The embodiment of the present disclosure further provides a storage medium. The storage medium stores a computer program, and the computer program is configured to run to execute any step in the method embodiment.

In an embodiment, in the embodiment, the storage medium may be configured to store a computer program for executing the following step:

At S1, a second communication node receives one or more PDCCHs from a first communication node, wherein when the second communication node receives multiple PDCCHs, PDSCHs indicated by the multiple PDCCHs are located in the same serving cell, and the indicated PDSCHs have the same time domain end position and different time domain start positions.

In an embodiment, in the embodiment, the storage medium may include but not limited to: various media capable of storing the computer program such as a U disk, an ROM, an RAM, a mobile hard disk, a magnetic disk or an optical disc.

Embodiment 17

The embodiment of the present disclosure further provides a storage medium. The storage medium stores a computer program, and the computer program is configured to run to execute any step in the method embodiment.

In an embodiment, in the embodiment, the storage medium may be configured to store a computer program for executing the following step:

At S1, a first communication node respectively sends one or more PDCCHs to a second communication node at multiple candidate time domain positions, wherein when the first communication node sends multiple PDCCHs, PDSCHs indicated by the multiple PDCCHs are located in the same serving cell, and the PDSCHs indicated by the multiple PDCCHs have the same time domain end position and different time domain start positions.

In an embodiment, in the embodiment, the storage medium may include but not limited to: various media capable of storing the computer program such as a U disk, an ROM, an RAM, a mobile hard disk, a magnetic disk or an optical disc.

Embodiment 18

The embodiment of the present disclosure further provides an electronic apparatus, which may include a memory and a processor; the memory stores a computer program; and the processor is configured to run the computer program to execute any step in the method embodiment.

At S1, a second communication node receives one or more PDCCHs from a first communication node, wherein when the second communication node receives multiple PDCCHs, PDSCHs indicated by the multiple PDCCHs are located in the same serving cell, and the indicated PDSCHs have the same time domain end position and different time domain start positions.

In an embodiment, the electronic device may further include a transmission device and an input/output device, and the transmission device is connected to the processor, and the input/output device is connected to the processor.

In an embodiment, the specific example in the embodiment may refer to the examples described in the above embodiments and optional embodiments, and will no longer be repeated herein.

Embodiment 19

The embodiment of the present disclosure further provides an electronic apparatus, which may include a memory and a processor; the memory stores a computer program; and the processor is configured to run the computer program to execute any step in the method embodiment.

At S1, a first communication node respectively sends one or more PDCCHs to a second communication node at multiple candidate time domain positions, wherein when the first communication node sends multiple PDCCHs, PDSCHs indicated by the multiple PDCCHs are located in the same serving cell, and the PDSCHs indicated by the multiple PDCCHs have the same time domain end position and different time domain start positions.

In an embodiment, the electronic device may further include a transmission device and an input/output device, and the transmission device is connected to the processor, and the input/output device is connected to the processor.

In an embodiment, the specific example in the embodiment may refer to the examples described in the above embodiments and optional embodiments, and will no longer be repeated herein.

It is apparent that those skilled in the art should understand that the modules or steps of the present disclosure may be implemented by a general-purpose computing device and centralized in a single computing device or distributed over a network consisting of a plurality of computing devices. In an embodiment, they may be implemented by a program code executable by a computing device, so that they may be stored in a storage device and executed by the computing device. Moreover, they may be different from the steps illustrated or described herein in some cases, or implemented by respectively fabricating them into respective integrated circuit modules or by fabricating a plurality of modules or steps of them into a single integrated circuit module. Therefore, the embodiments of the present disclosure are not limited to any specific hardware and software combination.

What is claimed is:

1. A data transmission receiving method, comprising:
    receiving, by a second communication node, one or more Physical Downlink Control Channels (PDCCHs) from a first communication node, wherein in a case where the second communication node receives multiple PDCCHs, Physical Downlink Shared Channels (PDSCHs) indicated by the multiple PDCCHs are located in the same serving cell, and the indicated PDSCHs have the same time domain end position and different time domain start positions;

the method further comprising:

determining, by the second communication node, time domain positions of the indicated PDSCHs according to a first PDCCH in the multiple PDSCHs; and in a case where the PDSCHs indicated by the multiple PDSCHs have different frequency domain positions, replacing, by the second communication node, a frequency domain indication of a second PDCCH with a frequency domain indication of the first PDCCH within a time domain indication range indicated by the first PDCCH in the PDSCHs, a time domain start moment of the PDSCH indicated by the first PDCCH is later than that of a PDSCH indicated by the second PDCCH.

2. The method as claimed in claim 1, wherein receiving, by the second communication node, the multiple PDCCHs from the first communication nodes comprises:

receiving, by the second communication node, through multiple Transmission Time Intervals (TTIs), a PDSCH indicated by at least one PDCCH in the multiple PDCCHs, the second communication node receiving one transport block on each TTI, or, the second communication node receiving one or more redundancy versions of the same transport block on the multiple TTIs.

3. The method as claimed in claim 1, wherein receiving, by the second communication node, one PDCCH from the first communication nodes comprises:

receiving, by the second communication node, through multiple TTIs, a PDSCH indicated by the PDCCH, wherein the second communication node receiving one transport block on each TTI, or, the second communication node receiving one redundancy version of the same transport block on each TTI.

4. The method as claimed in claim 2, further comprising:

in a case where the PDCCH comprises an indication for indicating whether to receive a demodulation pilot signal on the TTI, receiving, by the second communication node, the demodulation pilot signal on a last odd number of TTI;

or, in the case where the PDCCH includes the indication for indicating whether to receive the demodulation pilot signal on the TTI, receiving, by the second communication node, the demodulation pilot signal on a last first TTI;

or, in a case where the second communication node receives different redundancy versions of the same transport block on the multiple TTIs, receiving, by the second communication node, data of a redundancy version 0 on the last first TTI, and in a case where the PDCCH comprises a redundancy version indication of the TTI, receiving the data of the redundancy version 0 on the last first TTI.

5. The method as claimed in claim 1, after receiving, by the second communication node, the multiple PDCCHs from the first communication nodes, further comprising:

when the second communication node detects that a Sounding Reference Signal (SRS) trigger in control information carried in the PDCCH is enabled, increasing, by the second communication node, an offset value at a time domain end position of a PDSCH indicated by the detected PDCCH to obtain a preset time domain position, the offset value being the number of time domain units predetermined by the first communication node and the second communication node; and when the second communication node determines that the time is greater than the preset time domain position, specifying, by the second communication node, that the SRS signal is sent on a first effective SRS resource in the serving cell.

6. The method as claimed in claim 5, wherein specifying, by the second communication node, that the SRS signal is sent on the first effective SRS resource in the serving cell comprises:

determining, by the second communication node, whether an indication for requiring to send an SRS signal of a special beam is received;

if the indication for requiring to send an SRS signal of a special beam is received, specifying, by the second communication node, the special beam to correspondingly send the SRS signal on an SRS resource in the serving cell; and if the indication for requiring to send an SRS signal of a special beam is not received, selecting, by the second communication node, according to a time sending sequence for SRS resources in the serving cell, the first effective SRS resource in the time sending sequence to send the SRS signal.

7. The method as claimed in claim 5, wherein specifying, by the second communication node, that the SRS signal is sent on the first effective SRS resource in the serving cell comprises:

determining, by the second communication node, whether an indication for requiring to send an SRS signal of a special antenna port is received;

if the indication for requiring to send an SRS signal of a special antenna port is received, specifying, by the second communication node, the special antenna port to correspondingly send the SRS signal on an SRS resource in the serving cell; and if the indication for requiring to send an SRS signal of a special antenna port is not received, selecting, by the second communication node, according to a time sending sequence for SRS resources in the serving cell, the first effective SRS resource in the time sending sequence to send the SRS signal.

8. The method as claimed in claim 1, after receiving, by the second communication node, the multiple PDCCHs from the first communication nodes, further comprising:

when the second communication node detects that a Channel State Information (CSI) trigger in control information carried in the PDCCH is enabled, increasing, by the second communication node, an offset value at a time domain end position of a PDSCH indicated by the detected PDCCH to obtain a preset time domain position, the offset value being the number of time domain units predetermined by the first communication node and the second communication node; and when the second communication node determines that the time is greater than the preset time domain position, specifying, by the second communication node, that CSI is reported on a first effective CSI reporting resource in the serving cell.

9. The method as claimed in claim 8, wherein specifying, by the second communication node, that the CSI is reported on the first effective CSI reporting resource in the serving cell comprises:

determining, by the second communication node, whether an indication for requiring to send an CSI signal of a special beam is received;

if the indication for requiring to send an CSI signal of a special beam is received, specifying, by the second communication node, the special beam to correspondingly report the CSI on a CSI resource in the serving cell; and if the indication for requiring to send an CSI signal of a special beam is not received, selecting, by the second communication node, according to a time sending sequence for CSI resources in the serving cell, the first effective CSI resource in the time sending sequence to report the CSI.

10. The method as claimed in claim 5, wherein the time domain end position of the PDSCH at least comprises: a symbol where the time domain end position of the PDSCH is located, a time subslot where the time domain end position of the PDSCH is located, a time slot where the time domain end position of the PDSCH is located or a subframe where the time domain end position of the PDSCH is located.

11. A data transmission sending method, comprising:
respectively sending, by a first communication node, one or more Physical Downlink Control Channels (PDCCHs) to a second communication node at multiple candidate time domain positions, wherein in a case where the first communication node sends multiple PDSCHs, Physical Downlink Shared Channels (PDSCHs) indicated by the multiple PDSCHs are located in the same serving cell, and the PDSCHs indicated by the multiple PDSCHs have the same time domain end position and different time domain start positions;

wherein the PDSCHs indicated by the multiple PDSCHs have the same time domain end position, and a frequency domain end position of a PDSCH indicated by a first PDCCH in the multiple PDSCHs is not smaller than that of a PDSCH indicated by a second PDCCH in the multiple PDSCHs; and a time domain start moment of the PDSCH indicated by the first PDCCH is later than that of the PDSCH indicated by the second PDCCH.

12. The method as claimed in claim 11, wherein respectively sending, by the first communication node, multiple PDCCHs to the second communication node at the time domain positions comprises:
at least sending, by the first communication node, on multiple Transmission Time Intervals (TTIs), a PDSCH indicated by a first sent PDCCH in the PDCCHs, the first communication node sending one transport block on each TTI, or, the first communication node sending one or more redundancy versions of the same transport block on the multiple TTIs.

13. The method as claimed in claim 11, wherein respectively sending, by the first communication node, one PDCCH to the second communication node at the time domain positions comprises:
sending, by the first communication node, on multiple TTIs, a PDSCH indicated by the PDCCH, the first communication node sending one transport block on each TTI, or, the first communication node sending one redundancy version of the same transport block on each TTI.

14. The method as claimed in claim 12, wherein
in a case where the PDCCH comprises an indication for indicating whether to send a demodulation pilot signal on the TTI, the first communication node sends the demodulation pilot signal on a last odd number of TTI;

or, in the case where the PDCCH comprises the indication for indicating whether to send the demodulation pilot signal on the TTI, the first communication node sends the demodulation pilot signal on a last first TTI;

or, in a case where the first communication node sends different redundancy versions of the same transport block on the multiple TTIs, the first communication node sends data of a redundancy version 0 on the last first TTI; and in a case where the PDCCH comprises a redundancy version indication of the TTI, the first communication node sends the data of the redundancy version 0 on the last first TTI;

or, in a case where the first communication node sends one transport block on each TTI, and in the case where the PDCCH comprises the redundancy version indication of the TTI, the first communication node sends the data of the redundancy version 0 on each TTI.

15. The method as claimed in claim 11, wherein the number of TTIs occupied by a PDSCH indicated by a third PDCCH in the multiple PDCCHs is smaller than the number of TTIs occupied by a PDSCH indicated by a fourth PDCCH in the multiple PDCCHs, and a time domain start moment of the PDSCH indicated by the third PDCCH is later than that of the PDSCH indicated by the fourth PDCCH.

16. The method as claimed in claim 15, wherein when the PDSCH is sent in K TTIs, the PDCCH is sent in the K TTIs; and the indicated PDSCH is sent in a (K+1-k)th TTI of the PDCCH with k TTIs comprised, the k being a positive integer not greater than the K and not smaller than 1.

17. The method as claimed in claim 11, wherein Downlink Control Information (DCI) carried in each PDDCH of the multiple PDCCHs is provided with an SRS trigger field, or the DCI carried in each PDDCH of the multiple PDCCHs is provided with a Channel State Information (CSI) trigger field.

18. A data transmission receiving apparatus, located in a second communication node, and comprising:
a receiving module, configured to receive one or more Physical Downlink Control Channels (PDCCHs) from a first communication node, wherein in a case where the second communication node receives multiple PDCCHs, Physical Downlink Shared Channels (PDSCHs) indicated by the multiple PDCCHs are located in the same serving cell, and the indicated PDSCHs have the same time domain end position and different time domain start positions;

the data transmission receiving apparatus is further configured to:
determine time domain positions of the indicated PDSCHs according to a first PDCCH in the multiple PDCCHs; and in a case where the PDSCHs indicated by the multiple PDCCHs have different frequency domain positions, replace a frequency domain indication of a second PDCCH with a frequency domain indication of the first PDCCH within a time domain indication range indicated by the first PDCCH in the PDCCHs, a time domain start moment of the PDSCH indicated by the first PDCCH is later than that of a PDSCH indicated by the second PDCCH.

* * * * *